March 8, 1966      C. T. MANZ      3,239,057
STUB HOLDING POUCH FOR WELDING ROD
Filed July 23, 1964
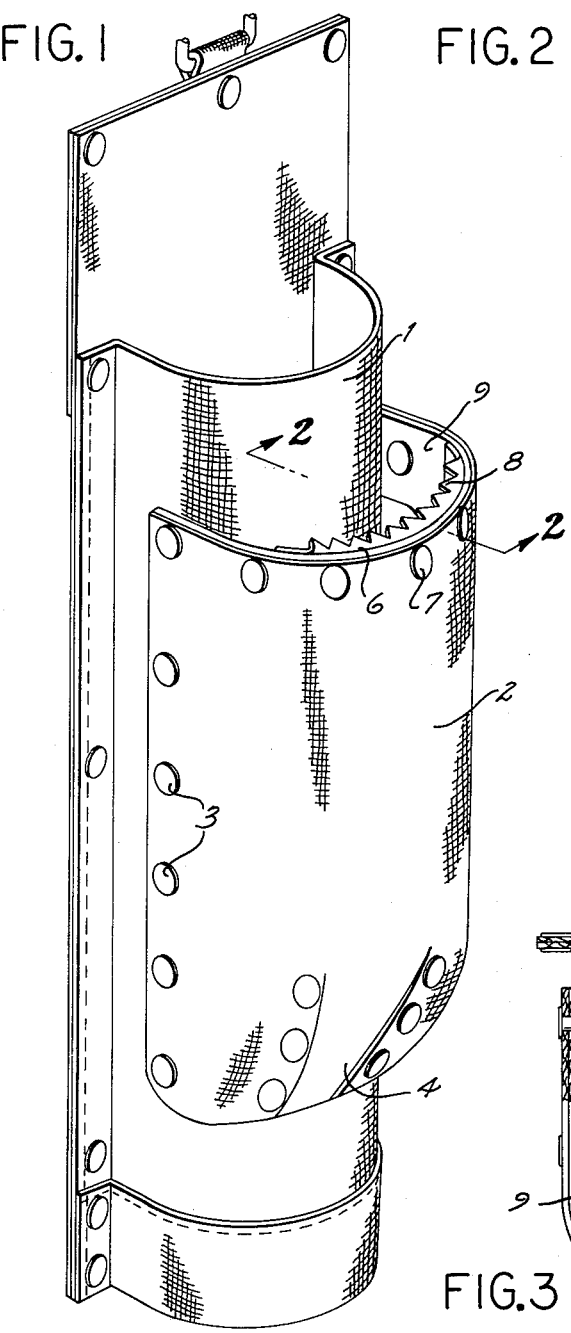
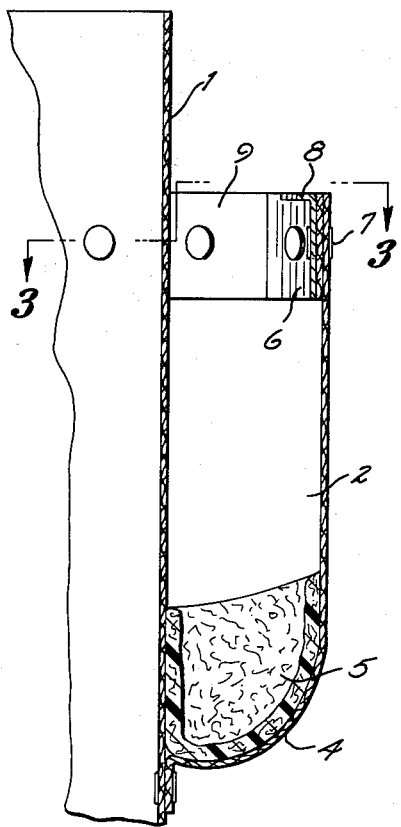
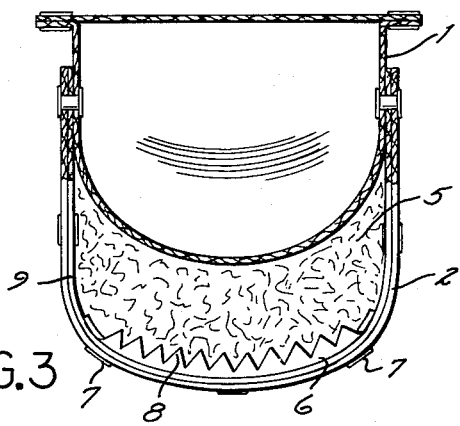
INVENTOR.
CURTIS T. MANZ
BY
ATTORNEY

3,239,057
STUB HOLDING POUCH FOR WELDING ROD
Curtis T. Manz, P.O. Box 2466, Long Beach, Calif.
Filed July 23, 1964, Ser. No. 384,602
3 Claims. (Cl. 206—1)

This invention relates to a stub holding pouch for welding rod into which reduced ends of a welding rod can be placed after the rod has been reduced to a point where the remaining rod is too short to be effectively used.

An object of my invention is to provide a novel stub holding pouch which is attached to or is a part of the rod holding pouch, and which can be easily and effectively used by the welder to deposit the short ends or stubs of welding rod. Thus these short ends or stubs will not litter the floor or area adjacent to a welding operation.

Another object of my invention is to provide a novel stub holding pouch which is an integral part of the larger pouch in which the full length welding rods are carried.

Still another object of my invention is to provide a novel stub holding pouch of the character stated, which is always readily available to the welder and which will receive substantial quantities of short rod stubs.

Other objects, advantages and features of invention may appear from the accompanying drawing, the subjoined detailed description and the appended claims.

In the drawing:

FIGURE 1 is a perspective view of my stub holding pouch.

FIGURE 2 is a fragmentary vertical sectional view taken on line 2—2 of FIGURE 1.

FIGURE 3 is a horizontal sectional view taken on line 3—3 of FIGURE 2.

Referring more particularly to the drawing, the numeral 1 indicates a welding rod pouch in which the full length rods are carried by the welder. This pouch is preferably formed of leather, although other similar materials may be employed, such as certain fabrics, plastics, or other materials. The pouch 1 is mounted on the welder's belt or clothing in a usual and well known manner, all of which forms no part of this invention. A stub pouch 2, of lesser length than the main pouch 1, is either attached to the pouch 1 by means of suitable rivets 3, or by means of stitching, or other suitable fastening means. The stub pouch is also preferably formed by the same material as the main pouch 1, namely, leather or other suitable material. The stub pouch 2 is closed at the bottom, as shown at 4, and is open at the top. The lower inner portion of the stub pouch 2 may be lined with a fire resistant material 5 if desired, so that the hot stubs or ends of the welding rod will not burn or ignite the stub pouch 2.

The upper or open end of the stub pouch 2 is held distended by means of a metal strap 6, which is attached to the stub pouch 2 by means of rivets 7 or the like. The metal strap 6 is formed with teeth or serrations 8 projecting inwardly, and these teeth are used to assist in removing the short stubs of welding rod from the welding torch or jaws of the rod holder.

The metal strap 6 extends only around the front portion of the open end of the pouch 2. The reason for this is to permit both sides 9 to be flexible and permit distortion of the top of the pouch, if struck by some object during the usual work of the user. If desired, an additional strip of leather, fabric, or the like can be included to further stiffen or distend the open end of the pouch.

*In operation*

The welding rod pouch 1 and the stub pocket or pouch 2 are carried by the welder during the progress of the work. From time to time the rod stubs as they are used are dropped into the pocket or pouch 2, and are carried by the welder until it is convenient to deposit all of the stubs in a waste receptacle or the like. Thus the rod stubs, if hot, are prevented from starting a fire, and the stubs also are prevented from cluttering the floor adjacent to the welding operation.

Having described my invention, I claim:

1. A stub holding pouch for welding rod comprising, a main welding rod holding pouch adapted and arranged to be carried by a welder
a stub pouch closed at the bottom and open at the top,
means mounting the stub pouch to the first named pouch,
and a stiffening strip at the upper end of said stub pouch,
and inwardly projecting teeth on said stiffening strip.

2. A stub holding pouch for welding rod comprising, a main welding rod holding pouch adapted and arranged to be carried by a welder,
a stub pouch closed at the bottom and open at the top,
means mounting the stub pouch to the first named pouch,
said means including rivets extending through the stub pouch and into the first named pouch,
and a stiffening strip at the upper end of said stub pouch,
and inwardly projecting teeth on said stiffening strip.

3. A stub holding pouch for welding rod comprising, a main welding rod holding pouch adapted and arranged to be carried by a welder,
a stub pouch closed at the bottom and open at the top,
means mounting the stub pouch to the first named pouch,
said means including rivets extending through the stub pouch and into the first named pouch,
and a stuffening strip at the upper end of said stub pouch,
and inwardly projecting teeth on said stiffening strip,
a fire retardant lining on the inside of said stub pouch.

References Cited by the Examiner
UNITED STATES PATENTS

| | | | |
|---|---|---|---|
| 986,273 | 3/1911 | Eloesser | 2—247 |
| 2,325,506 | 7/1943 | Grace | 206—1 |
| 3,172,583 | 3/1965 | Smith | 224—5.2 |

HUGO O. SCHULZ, *Primary Examiner.*